United States Patent

Hussmann et al.

Patent Number: 5,184,024
Date of Patent: Feb. 2, 1993

[54] APPARATUS TO REGULATE THE ILLUMINATION RANGE OF A MOTOR VEHICLE

[75] Inventors: Micha Hussmann, Lippstadt; Joachim Hufnagel, Menden, both of Fed. Rep. of Germany

[73] Assignee: Hella KG Hueck & Co., Lippstadt, Fed. Rep. of Germany

[21] Appl. No.: 737,724

[22] Filed: Jul. 30, 1991

[30] Foreign Application Priority Data

Aug. 6, 1990 [DE] Fed. Rep. of Germany ....... 4024912

[51] Int. Cl.$^5$ .......................... B60L 1/14; B60Q 1/115
[52] U.S. Cl. ...................................... 307/10.8; 315/82; 362/71
[58] Field of Search ................ 362/37, 71; 315/77-82; 307/10.8, 120, 121, 10.1, 9.1; 364/424.05; 200/61.89, 61.45 R; 73/510, 511

[56] References Cited

U.S. PATENT DOCUMENTS

| | | | |
|---|---|---|---|
| 3,840,730 | 10/1974 | Andres et al. | 362/71 |
| 4,486,688 | 12/1984 | Schmitz | 362/71 X |
| 4,620,267 | 10/1986 | Cibie | 362/71 |
| 4,963,794 | 10/1990 | Shibata et al. | 315/81 |

FOREIGN PATENT DOCUMENTS

31010094A1 9/1982 Fed. Rep. of Germany.
3827983C1 2/1990 Fed. Rep. of Germany.

OTHER PUBLICATIONS

G. Couffinhal et al.; "Lighting Control Devices"; Electronics; London, England; Oct. 29–Nov. 2, 1979; pp. 200–204.

Primary Examiner—A. D. Pellinen
Assistant Examiner—Fritz M. Fleming
Attorney, Agent, or Firm—Griffin Butler Whisenhunt & Kurtossy

[57] ABSTRACT

In an apparatus to regulate the illumination range of a motor vehicle having: a front axle sensor sender (V) on a front wheel axle and a rear axle sensor sender (H) on a rear wheel axle whose output signals depend upon the relative position of a motor vehicle body to the wheel axles; a nominal-value former (S) which forms a difference between the signals from the front axle sender and the rear axle sender; a first filter (F1), including an average-value former, which, in dependence upon a first filter time constant of the first filter, forms filtered, nominal-value, signals from the unfiltered nominal-value signals of the nominal-value former; and a regulator (R) which regulates adjusting elements for adjustment of positions of headlights, in order to provide an apparatus which, in an uncomplicated and cost-effective manner without the use or analysis of road, or travel signals, upon braking of the motor vehicle improves a dynamic of illumination range regulation, the nominal-value former is coupled with the first filter and with a second filter (F2), with the second filter having a second filter time constant which is shorter than the first filter time constant of the first filter, with the regulator being selectively coupled to the first filter or the second filter via a switch-over device (SE), and the switch-over device being controllable by signals from a brake pedal switch (B).

2 Claims, 1 Drawing Sheet

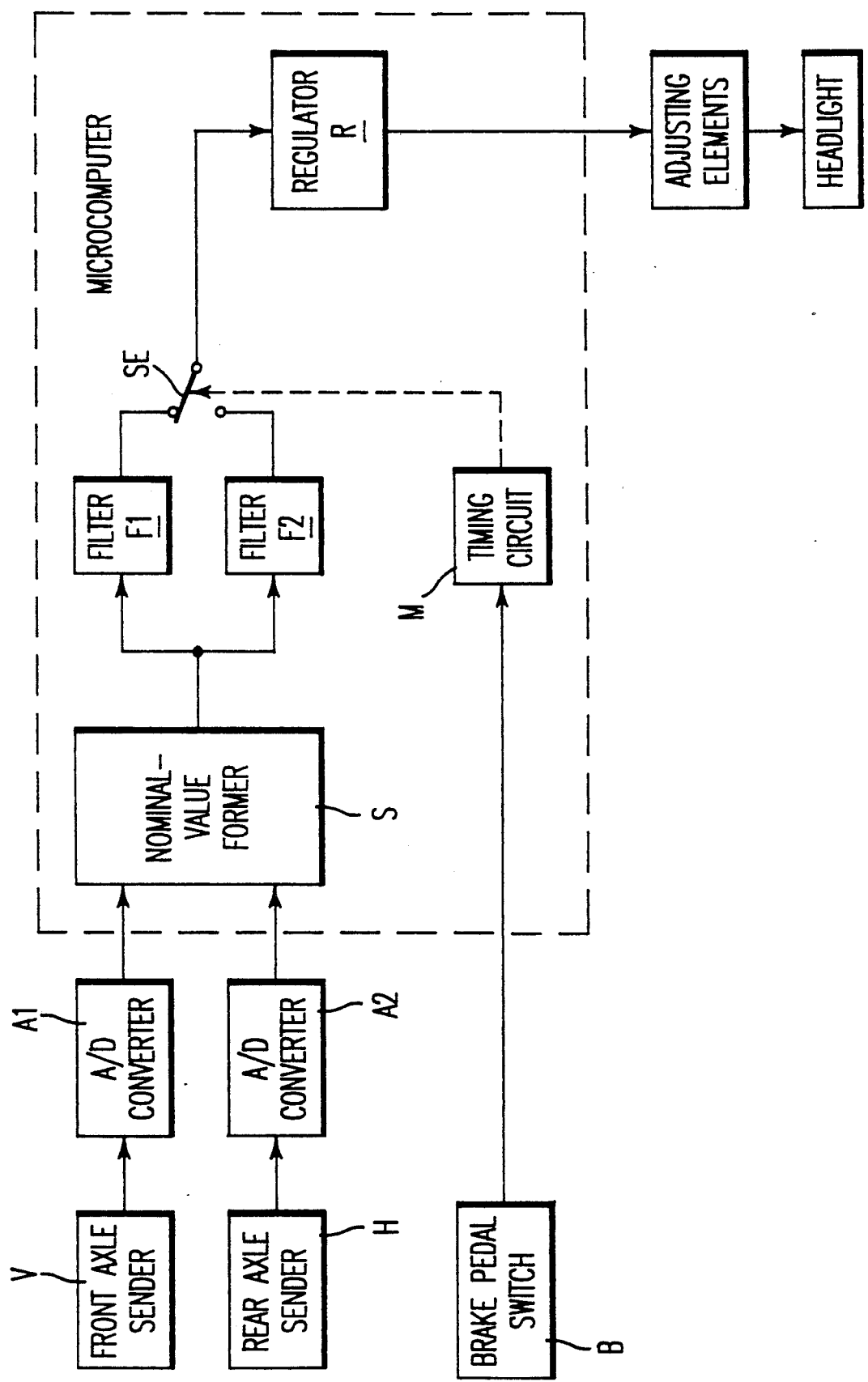

APPARATUS TO REGULATE THE ILLUMINATION RANGE OF A MOTOR VEHICLE

BACKGROUND OF THE INVENTION

This invention concerns an apparatus to regulate the illumination range of a motor vehicle having a front axle sender at a front wheel axle, a rear axle sender at a rear axle (output signals of the senders being a function of a relative position of a motor vehicle body to the wheel axles), a nominal-value former which forms a difference between the signals from the front axle sender and the rear axle sender, a first filter including an average-value former which, in dependence on a first filter time constant, develops filtered nominal-value signals from the unfiltered nominal-value signals of the nominal-value former, and a regulator which regulates adjusting elements to adjust positions of headlights.

An apparatus to regulate the illumination range of a motor vehicle of this type is disclosed in German Offenlegungsschrift DE OS 31 10 094 A1.

Sensors which measure the relative position of a motor vehicle body to motor vehicle axles or motor vehicle wheels are coupled to an analog-multiplexer which feeds the available signals from the sensors via an analog/digital converter to a microprocessor. A filtering of the appearing signals results in which, in a fixed time span, an average-value formation of the signals is carried out. In addition, the amount, or number, of the average values to be included is assumed or predetermined. From the average values then for each sensor pair corresponding to a front axle sensor and a rear axle sensor, a difference signal is formed that corresponds to a headlight adjustment value. Each of these difference signals is fed to a digital/analog converter which is respectively coupled over a subsequently coupled operational amplifier with a headlight adjusting device. In dependence upon a sign (+ or −) of the difference signal, the adjusting elements will be thereby moved forwardly or rearwardly and a headlight storage register in a microprocessor will count upwardly or downwardly.

This known apparatus has proven itself to be disadvantageous for the regulation of the illumination range of a motor vehicle in that the average value formation only occurs in a fixed time interval so that an adaptation to changing operating conditions of the motor vehicle cannot take place. In particular, upon braking the motor vehicle, which in a short time leads to great inclination changes of the motor vehicle body, the adjustment of the illumination range is not changed quickly enough to exclude a blinding of oncoming traffic and other losses of safety which can lead to dangerous situations upon operation of a motor vehicle. This is particularly true when, as with the known apparatus, for example, a filter time constant in a size range of around a minute is chosen so that upon braking, in particular upon strong braking, and as well as also after braking, the adjustment of the headlights, and thereby the illumination range of the motor vehicle, has false adjustments which can lead to dangerous situations.

Further, known apparatus have proven to be disadvantageous in that four sensors on wheel axles are provided which feed their signals over an analog-multiplexer to a processor because this results in a costly device which additionally, in an expensive manner, is cost intensive to manufacture and mount.

It is an object of this invention to provide an apparatus which, in an uncomplicated and cost-effective manner, without a travel, or road signal being present and analyzed, upon braking incidents of a motor vehicle, improves the dynamic of regulation of the illumination range.

SUMMARY

According to principles of this invention, apparatus to regulate illumination range includes a nominal-value former which is connected to a first filter and to a second filter, with the second filter having a second filter constant which is shorter than a filter constant of the first filter, with a regulator being selectively coupled to the first or the second filter via a switch-over device, and with the switch-over device being controlled by signals from a brake pedal switch.

Other objects of the invention and its mode of operation will become apparent upon consideration of the following description and the accompanying drawings.

BRIEF DESCRIPTION OF THE DRAWING

The foregoing and other objects, features and advantages of the invention will be apparent from the following more particular description of a preferred embodiment of the invention as illustrated in the accompanying drawing in which reference characters refer to the same parts throughout the drawing. The drawing is not necessarily to scale, emphasis instead being placed upon illustrating principles of the invention in a clear manner.

The drawing is a block circuit diagram of this invention for regulating illumination range of a motor vehicles according to principles of this invention.

DESCRIPTION OF A PREFERRED EMBODIMENT

A front axle sensor sender (a device including or associated with a sensor for sending a sensed signal) V which produces analog signals which are functions of the relative position of a motor vehicle body to the front axle is electrically conductively coupled to a nominal-value former S via a first analog/digital-converter A1 which converts available analog signals from the front axle sender. A rear axle sender H which produces analog signals which are a function of the relative position of the motor vehicle body to the rear axle is electrically conductively coupled to the nominal-value former S via a second analog/digital converter A2 which converts the analog signals from the rear axle sender H.

The nominal-value former S forms, or develops, the difference between the signals from the front axle sender V and those from the rear axle sender H and produces thereby nominal-value signals. Depending upon demands, the nominal-value former S multiplies these nominal-value signals by a correcting factor for further processing.

The nominal-value former S is electrically conductively coupled with a first filter F1, which has a first filter time constant which carries out a first average, or mean, value formation of the nominal-value signal from the nominal-value signal former S and which in this manner produces a first filtered nominal-value signal.

The nominal-value former S is additionally electrically conductively coupled with a second filter F2 which has a second filter time constant that is shorter than the first filter time constant of the first filter F1 and thereby over the duration of the second filter time constant carries out an average value formation of the nominal-value signals from the nominal-value former S. Thusly formed second filtered nominal-value signals from the second filter F2 are to, a large extent, dependent upon short duration inclination changes of the motor vehicle body because of the short second filter time constant and therefore make possible a regulation of the illumination range in which short duration inclination changes of the motor vehicle body are respected (used for regulating) to a greater extent then when a longer filter time constant is used to filter the nominal-value signals. The filtered time constants of the first filter F1 can thereby, for example, be about 1 second while the second filtered time constant or the second filter F2 for example, can be around 0.5 seconds. Depending upon application and demands, these filtered time constants can be chosen to be larger or smaller.

A switch-over device SE selectively couples the regulator R electrically conductively with the first filter F1 or the second filter F2. The switch-over of the switch-over device S results thereby from signals which are produced by a brake pedal switch B. The brake pedal switch B can in a particular embodiment be coupled with a timing circuit in the form of a monostable relaxation stage, or oscillator, M, which reverses, or switches over, the switch-over device SE only for a fixed time determined by the relaxation stage M; that is, the regulator R is placed in connection with the second filter F2 for this fixed time. The regulator R regulates, based on filtered nominal-value signals fed it, the position of adjusting elements (not shown here) which adjust the positions of headlights for illumination range adjustment.

The operation of the inventive apparatus of this invention will be described in more detail with reference to the above-described embodiment and the drawing.

During rest and operation of a motor vehicle, the front axle sender V and the rear axle sender H produce, or form, analog signals which are a function, or depend from, the relative position of the motor vehicle body to the wheel axles or wheels of the motor vehicle. These analog signals from the front axle sender V and the rear axle sender H are digitalized by analog/digital converters A1, A2 and fed to the nominal-value former S. This nominal-value former S develops nominal-value signals in which the difference between the signals from the front axle sender V and the rear axle sender H are formed. Depending on demands, these difference signals, which represent nominal-value signals, are multiplied by a correcting factor for a simplified further processing of the nominal-value signals.

These nominal-value signals are simultaneously fed to the first filter F1 and the second filter F2, whereby the first filter F1, because of its first filter time constant, carries out a first average-value, or mean-value, formation and the second filter F2, because of its second filter time constant, carries out a second average-value, or mean-value, formation of the nominal-value signal. The first filter F1 and the second filter F2 thereby form, independently of one another, filtered nominal-value signals which depend from, or are functions of, the filter time constants. The second filter time constant of the second filter F2 has a shorter period than the first filter time constant of the first filter F1 so that the second filtered nominal-value signal formed by the second filter F2 has a greater dependence on short-time-period changes of the inclination of the motor vehicle body. Upon a normal operation of the motor vehicle, that is either in a rest position or in a driving operation, regulation of the illumination range results from the first filtered nominal value signal from the first filter F1 having a filter time constant that here, for example, lies in a size range of around one second which, however, also depending upon operational requirements, can be larger or smaller and which assures that, upon operation of the motor vehicle, the illumination range is regulated as best possible, that is, that blindings of oncoming traffic or losses in safety, which can lead to dangerous situations, are avoided. The first filter time constant of the first filter F1 is thereby so chosen that the adjustment elements whose positions are regulated by the regulator R for one thing can easily follow regulating swings and for another thing are assured of having a long life span.

Upon braking situations, particularly upon dangerous braking situations, it is possible that the first filter time constant of the first filter F1 is too long to respect short-duration, great, inclination changes of the motor vehicle body upon average-value forming and formation of the filtered nominal-value signals so that vision range will not be lost and thereby dangerous situations created upon operation of the motor vehicle; thus, with the invention shown here, upon the presence of brake operation, regulation from the first filtered nominal-value signal is switched over to regulation from the second filtered nominal-value signal.

The second filtered nominal-value signal is developed by average-value formation which has a shorter second filter time constant than the first average-value formation by means of the first filter F1. Thereby also such inclination changes of the motor vehicle which are caused by braking actions, in particular braking actions during danger, can involve better control of the regulation of illumination range so that, upon braking actions, vision-range loss is avoided as best possible.

In the first embodiment, the signal from a brake pedal B directly reverses a switch-over device SE, that is, if the brake pedal is activated, a signal appears on the brake pedal switch B that controls the switch-over device SE in such a manner that the connection between the first filter F1 and the regulator R is disconnected and the second filter F2 is placed in connection with the regulator R for a faster regulation. The second filter F2 remains thereby connected with the regulator R until the signal from the brake pedal switch B, that is caused by an activation of the brake, is no longer present. Then the coupling between the second filter F2 and the regulator R is again disconnected and the first filter F1 is placed in connection with the regulator R.

In another embodiment, the brake pedal switch B is electrically conductively coupled with the monostable sweeping, or relaxing, stage M so that, upon a braking and a presence of a signal from the brake pedal switch B, the switch-over device SE is only reversed and the regulator R is only coupled with the second filter F2, for such a time as is determined by the relaxation stage M. This time of reversal is thereby so determined that, upon braking, the illumination range of the motor vehicle is corrected in such a manner that losses of vision upon such braking incidents are avoided.

It is beneficial that the nominal-value former is coupled to a first filter and to a second filter because in this manner, independently of one another, two, distinctive in average value formation from one another, filtered nominal-signals can be formed with which it is possible to change the regulation of illumination range of a motor vehicle as a function of different operational conditions, which leads to a particularly dependable regulation which assures in the best possible manner that dangers upon operation of the motor vehicle, caused by blinding of oncoming traffic or through vision range loss are avoided.

In this regard, it is particularly beneficial that the second filter has a second filter time constant which is shorter than the first filter time constant of the first filter because in this manner a second filter nominal-value signal can be formed with which the regulation of the illumination-range for quicker, short-duration, changes in the level of the motor vehicle body are processed whereby false adjustments of the illumination range are dependably avoided. Because the regulator is selectively connectable via the switch-over device with the first filter and with the second filter the advantage of a particularly sure and dependable uncomplicated and cost-effective reversal possibility of the regulation of the illumination range from the first filtered nominal-value signal to the second filtered nominal-value signal results.

In this regard, it is particularly beneficial that the switch-over device is reversible by signals from a brake pedal switch because in this way, in a particularly uncomplicated and cost-effective manner, without a travel path, or road signal, being present or evaluated, upon a braking incident of the motor vehicle, control switches from a first filtered nominal-value signal formed by a long filter time constant to a second filtered nominal-value signal which is formed by a second shorter filter time constant, whereby, in a particularly dependable and sure manner, regulation of the light range, upon braking incidents, results in dependence upon a second filtered nominal-value signal that more quickly respects short time inclination changes of the motor vehicle upon braking incidents and regulates in the same manner of regulation as with the first filtered nominal-value signal, whereby false adjustments of the illumination range, in particular upon strong braking and during and after a braking incident, uncomplicatedly, cost-effectively, and dependably are avoided.

It is beneficial that the signals from the brake pedal switch directly reverse the switch-over device because in this means and manner, uncomplicatedly and cost-effectively during each braking incident, regulation of the illumination range by the second filtered nominal-value signal, which is formed because of a second short filter time constant, results so that all inclination changes of the motor vehicle body during a braking incident are as best possible, upon regulation and adjustment of the headlights, respected. After successful braking, that is when no signal from the brake pedal switch is still present, the regulator is again coupled to the first filter via the switch-over device SE so that regulation of the illumination range caused by the first filtered nominal-value signal results which by means of an average-value formation is developed by the first, longer, filter time constant, whereby the life spans of the adjusting elements are increased because of a smaller number of regulating incidents.

Because the brake pedal switch is coupled with a monostable relaxation stage, whose output signals control the switch-over device, the benefit result that the reversal upon the starting of a braking incident, only results for a fixed time period determined by the monostable relaxation stage, whereby, upon braking incidents, regulation of the illumination range for this predetermined time period results in dependence upon the second filtered nominal-value signal that is formed because of the second shorter filtered time constant, whereby, by means of proper choice of the fixed time period for the reversal of the switch-over device by the monostable relaxation stage, it is assured that the inclination changes in the motor vehicle body which are caused by the braking incidents bring about a regulation of illumination range which is so controlled that a danger upon operation of the motor vehicle because of blinding of oncoming traffic or because of vision range loss can be excluded.

Because any combination of or all of the nominal-value former and the filters and the switch-over device and/or the regulator and the monostable relaxation stage are parts of a microcomputer as indicated by dashed lines surrounding all these elements in the drawing the benefit of a particularly uncomplicatedly and cost-effectively manufacturable and mountable apparatus to control the illumination range of a motor vehicle results.

The invention in which an exclusive property or privilege is claimed is defined as follows.

We claim:

1. Apparatus to regulate the illumination range of a motor vehicle having a front axle sender at a front wheel axle and a rear axle sender at a rear wheel axle whose output signals are a function of the relative position of a motor vehicle body to the wheel axles, having a nominal-value former which forms nominal-value signals indicative of a difference between the signals from the front axle sender and the rear axle sender, having a first filter including an average-value former which, in dependence upon a first filter time constant of the first filter, forms filtered nominal-value signals from the nominal-value signals of the nominal-value former, and having a regulator which regulates adjusting elements for adjustment of positions of headlights, wherein the improvement that the apparatus further includes a second filter, the nominal-value former is coupled with the first filter and the second filter, the second filter has a second filter time constant which is shorter than the first filter time constant of the first filter, the regulator is coupled to the first filter or the second filter by a switch-over device, the switch-over device is controllable by a signal from a brake-pedal switch, and the brake pedal switch is coupled with a timing circuit whose output signals control the switch-over device.

2. Apparatus as in claim 1 wherein at least two of the nominal-value former and the filters and the switch-over device and the regulator and the timing circuit are parts of a microcomputer.

* * * * *